UNITED STATES PATENT OFFICE.

OTTOKAR HENRY NOWAK, OF CHICAGO, ILLINOIS, ASSIGNOR TO FRANÇOIS LEBREIL AND RAOUL DESGEORGE, OF LYON, FRANCE.

PROCESS OF PRODUCING PLASTIC SUBSTANCES FROM MILK.

1,031,814.　　　　　Specification of Letters Patent.　　Patented July 9, 1912.

No Drawing.　　　Application filed June 12, 1908.　Serial No. 438,031.

*To all whom it may concern:*

Be it known that I, OTTOKAR HENRY NOWAK, a citizen of the United States, residing at Chicago, in the county of Cook and State of Illinois, have invented certain new and useful Improvements in Processes of Producing Plastic Substances from Milk, of which the following is a specification.

My invention relates in general to a compound derived from all kinds of skimmed milk and the process of making the same.

By my invention the products of the compound can be made transparent or opaque in any desired color and resemble hard rubber, amber, horn, tortoise shell, marble, onyx, and other like substances in appearance and formation, and not only in their general properties but also in their steam and water (hot or cold) resisting qualities. Furthermore, they are fire, alkali, and acid proof.

In the production of the compound which I have invented I coagulate the curd of skimmed milk and treat the coagulum with a ketone or any of the derivatives thereof; the various steps in the process for obtaining this compound may be briefly described as consisting in precipitating the curd of skimmed milk (as by means of its natural fermentation), dissolving the curd in any alkali (preferably in ammonia, bicarbonate of sodium or sodium borate solutions), recoagulating the solution thus obtained (as by any mineral or organic acid or their acid salts in connection with water), and treating the coagulum or the solution with ketones or their derivatives as by the addition of phenyl-methyl ketone or dimethyl ketone solution. Or a solution of ortho-toluol-sulfamid may be used. These substances render the coagulum insoluble and the coagulum may be mixed with various anilin or mineral colors or vegetable pigments, and is reduced or comminuted into uniform and small particles which are separated from the liquid or water content, as by pressure, until their mass assumes a putty like consistency. This coagulum (either before or after the water is expressed therefrom) forms an insoluble product or compound which may be shipped as a raw material and may be fashioned into plates or blocks of any desired size and thickness for utilization in various industries.

Obviously the several steps of the process and the various materials employed may be varied as in forming my composition I am not limited to any particular ketone or any specific material in the several subsidiary steps, and in the subjoined more particular description of the various steps of my process I describe a particular embodiment of my process for sake of clearness and not with any intention of limiting myself to any of the particulars there enumerated. I first permit the precipitation of the curd contained in skimmed milk, in a wooden tank, which generally occurs as the result of the natural decomposition within about twelve hours from the time the cream was removed or separated from the whole milk. To quicken the coagulation of the curd I may heat the skimmed milk by means of live steam to about 140° Fahrenheit. After the coagulum has settled in the tank, the liquid part is removed from the tank either by means of a siphon or by gravity or in any desired manner, and the remaining coagulum in the tank (which tank is provided with any suitable mixing attachment) is mixed under constant stirring or washing with cold water to eliminate all fatty matters and soluble albumens, and then dissolved either with the addition of an ammonia solution, or a 5% bicarbonate of sodium solution, or a 5% borax solution, until the coagulum is dissolved again and the solution has the appearance of skimmed milk as before. This liquid or solution is then precipitated again or recoagulated in the same vessel or tank under constant agitation or stirring by slowly adding a 5% solution of mineral or organic acid or their acid salts until the completion of the coagulation is recognized by the liquid around the coagulum becoming clear.

The solution or coagulum is treated by adding ketones or their derivatives. For example I may add 1½% up to 2% of phenyl-methyl ketone or dimethyl ketone, or if desired 5% of a 5% solution of ortho-toluol sulfamid in water. The acid and ketone may be added together or separately as desired, and after the re-coagulation is completed the mixing apparatus is stopped to allow settlement, and afterward the clear water above the coagulum is drawn off and the coagulum is ready to be reduced or comminuted which preferably is so accomplished as to divide it into very minute particles of uniform size. This may be done by pressing or washing it through a 120 mesh screen; in practice I prefer to use a brass screen or cloth revolving slowly in another vessel or tank and about half under water. The water is then drained off and the coagulum remains in a putty like consistency. The coagulum may be mixed with any suitable coloring matter or the like, if desired; as either with anilin color solutions in water or alcohol, or mineral colors in paste form, or vegetable pigments in paste form. This insoluble coagulum, either colored or not, and either before or after the water is expressed therefrom, is a commercial product and may be marketed as such to be subsequently worked up for any of the various purposes for which it is adapted. If it is desired to reduce the coagulum to plates or sheets or blocks it may be pressed by any suitable means (such as a filter press, for example) and then dried. If only a drying kiln with means to control the temperature be employed, the material as it comes from the press should not contain over 40% of free water, as an excess of water may cause blistering either on the surface or in the material of the plates, etc. I prefer to dry the plates, etc., under a vacuum of about twenty inches and to start with a temperature of about 140° Fahrenheit and finish at about 180° Fahrenheit. Also I find that better results are obtained by drying the plates under pressure, and by seasoning them under pressure after drying in order to avoid warping and cracking.

The acid or acid salts to be chosen for the re-coagulation depends somewhat upon the desired physical appearance of the final product. For example, if the final product of the insoluble coagulum is to resemble hard rubber, sulfuric acid, or sulfate of lime, acetic acid or acetate of lead preferably should be used, not only for the purpose of securing flexibility but also in regard to the color which will be preferably white, with a high gloss if polished. The product may also be used as a packing for the highest pressure in engines, and also can be vulcanized just as rubber is if desired. For amber imitations, I am using picric acid in a 5% solution so assuring the natural appearance of amber, transparent and opaque. The transparent appearance is obtained by using picric acid solution alone, the opaque appearance in using picric acid solutions in connection with the sulfuric or acetic salts. For hornlike and tortoise-shell imitations I prefer to use acetic acid solutions in connection with acetate of lead or other lead salts, and the proportions may be ascertained by reference to the color or appearance desired. For marble imitations or onyx imitations I prefer to use acetate of lead solutions.

I claim:—

1. The herein described process for the production of a plastic product which consists in adding to casein a small percentage of a ketone and subjecting the mixture to the action of heat.

2. The process for the production of a plastic product which consists in adding to casein an acidulating medium and a small percentage of a ketone and subjecting the mixture to the action of heat.

3. The process herein described for the manufacture of milk products consisting in eliminating soluble matters from and dissolving the curd of milk, re-coagulating the solution by means of an acid salt, and adding a ketone thereto.

4. The process herein described for the manufacture of milk products consisting in eliminating soluble matters from the curd of milk, dissolving the coagulum under agitation, re-coagulating the solution under agitation by an acid or acid salt, adding a ketone to the coagulum, comminuting the coagulum in water, expressing the water from the mass, forming the mass into layers, and drying the layers under pressure in a vacuum.

In testimony whereof I affix my signature in presence of two witnesses.

OTTOKAR HENRY NOWAK.

Witnesses:
GEORGE R. HARBAUGH,
J. MCROBERTS.